UNITED STATES PATENT OFFICE.

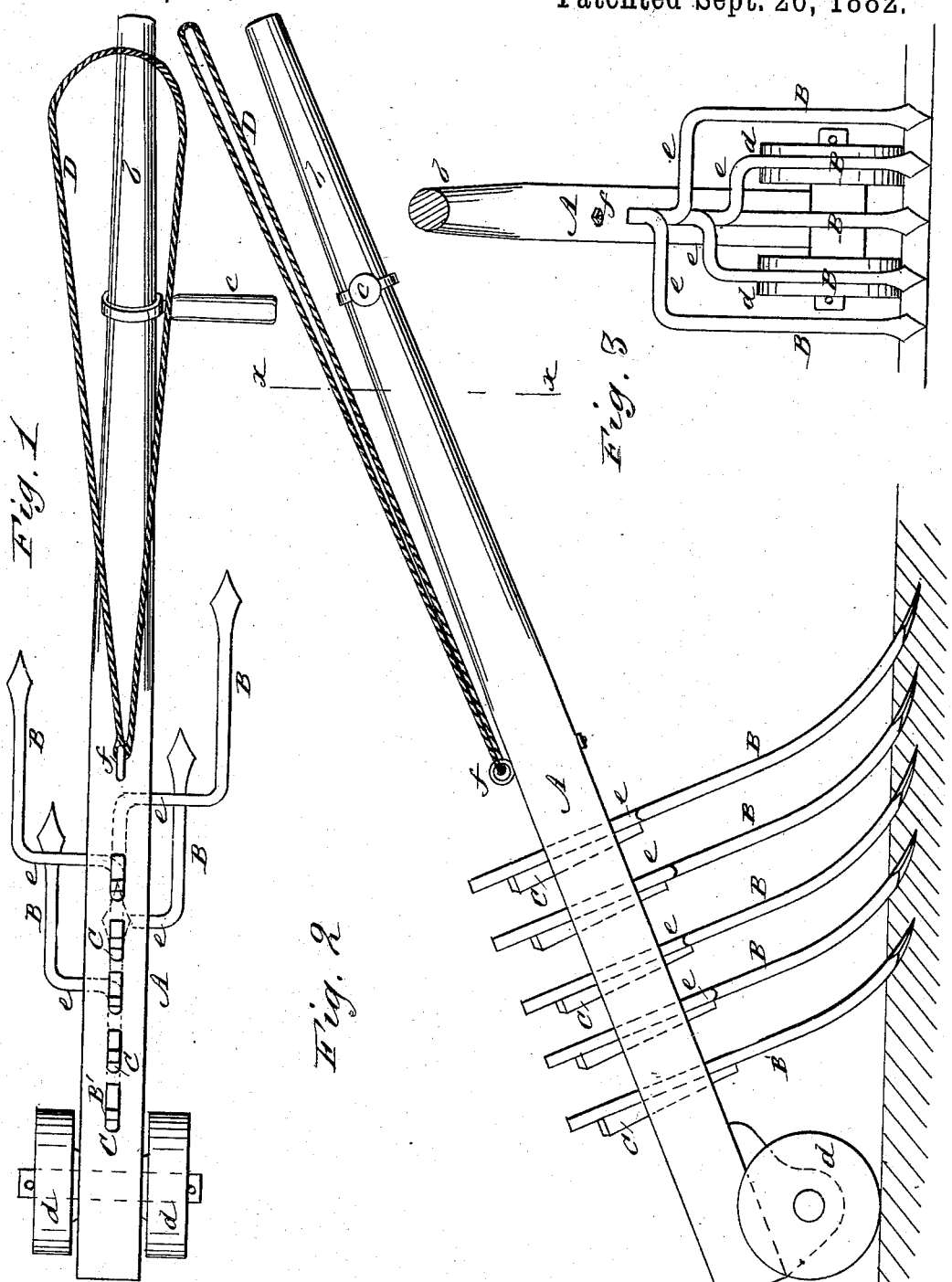

WILLIAM BLAKE, OF CHESTER, SOUTH CAROLINA.

CULTIVATOR.

SPECIFICATION forming part of Letters Patent No. 265,009, dated September 26, 1882.

Application filed May 2, 1882. (No model.)

*To all whom it may concern:*

Be it known that I, WILLIAM BLAKE, of Chester, in the county of Chester and State of South Carolina, have invented a new and useful Improvement in Cultivators, of which the following is a full, clear, and exact description.

This invention has for its object the production of a hand-cultivator which shall be applicable to stirring up the soil between growing crops in gardens and other plots; and it consists in certain novel constructions and combinations of parts whereby the cultivator may be conveniently supported in front by a band or strap passing over the shoulders of the operator and be readily guided and adjusted as regards the depth to which it should work by simply pressing on certain handles which form fixed attachments to the beam as the operator draws the cultivator after him; and other conveniences and advantages are obtained, substantially as hereinafter described.

Reference is to be had to the accompanying drawings, forming part of this specification, in which similar letters of reference indicate corresponding parts in all the figures.

Figure 1 represents a plan of a hand-cultivator constructed in accordance with my invention. Fig. 2 is a side view of the same, and Fig. 3 a vertical transverse section on the line *x x*.

A in the drawings indicates a beam or scantling, which may be seven feet long, more or less, and of any desired width and thickness. The front half or portion in a lengthwise direction of this beam is turned or dressed down toward its forward end small enough to form a handle, *b*, from which portion is projected a lateral handle, *c*, similar, as regards its relation with the beam or its handle-extension *b*, to a scythe-snath handle, and which may be arranged at a distance of two and a half feet, more or less, from the front end of the handle *b*. The back half or portion of the beam A forms the body of the cultivator, at the rear end of which are a pair of light wheels, *d d*. At a short distance in front of these wheels is arranged the back tooth, B', of a series of cultivator-teeth, B B', of which there may be five, more or less, arranged one in front of the other. These teeth, or rather the legs or upper portions of them, are fitted to pass through mortises in the beam A, and are securely held in place therein by wedges C. Said teeth may be made out of square bar-iron, and be pointed with steel at their lower ends. The back tooth, B', is made what may be termed straight—that is, constructed to work in a plane which is central in relation with the length of the beam, while the other teeth, B, in front of it are cranked, as at *e*, some to the right and others to the left, and with their cranked portions *e* of different lengths, thus the two teeth B immediately in front of the rear teeth, B', are cranked two and a half inches, more or less, one to the right and the other to the left, and the two front teeth are similarly cranked, but to a greater extent, every tooth excepting the rear one being cranked alternately in reverse directions or to opposite sides of the beam. Such arrangement of the cranked teeth, however, may be more or less varied.

Attached to the beam A by a staple or ring-bolt, *f*, at a short distance in front of the cultivator-teeth, is a band, looped rope, or strap, D, long enough to be thrown over the shoulders of the operator, who thereby is enabled to draw the cultivator over the ground with almost as much ease as drawing a rake. At the same time, holding with his one or right hand the handle *c* and with his other hand the handle *b*, he has all the necessary control over the implement, not only as regards drawing and directing it, the handle *c* being a great assistance in this respect, but as regards adjusting it to work at different depths by simply raising or lowering the handle portion *b* of the beam.

By taking out one or more of the cranked cultivator-teeth, of which there may be any desired number, the implement may be adjusted to work between row of different widths. This is easily done by taking out the wedges C, which hold the teeth in place.

A hand-cultivator constructed to operate as described is cheaply and readily made, and will thoroughly stir the soil to the destruction of all weeds, and leave the soil in a smooth mellow condition, the same working more like a rake, and leaving no tracks.

I am aware that a cultivator-frame with its teeth spreading toward the front has been heretofore connected to an axle and to the bail of the handle, and I am also aware that side handles and straps are not broadly new, and I therefore do not claim such inventions, my invention being confined to the precise construction and arrangement of parts as pointed out in the claim.

Having thus described my invention, I claim as new and desire to secure by Letters Patent—

A hand-cultivator consisting of the beam A, having its forward end reduced to form a handle, b, and its rear end provided with a series of mortises, the straight rear tooth, B', and the bent teeth B, secured in said mortises, the wheels d, journaled to the rear end of the beam, the laterally-projecting handle, c and the stop D, substantially as herein shown and described.

WILLIAM BLAKE.

Witnesses:
B. M. SPRATT,
L. M. FAIRE.